United States Patent
Zhu (10) Patent No.: US 9,828,066 B2
(45) Date of Patent: Nov. 28, 2017

(54) MOVEMENT DEVICE CAPABLE OF GENERATING GREATER PROPELLING FORCE

(71) Applicant: Xiaoyi Zhu, Shenzhen (CN)

(72) Inventor: Xiaoyi Zhu, Shenzhen (CN)

( * ) Notice: Subject to any disclaimer, the term of this patent is extended or adjusted under 35 U.S.C. 154(b) by 0 days.

(21) Appl. No.: 15/255,975

(22) Filed: Sep. 2, 2016

(65) Prior Publication Data

US 2016/0368566 A1    Dec. 22, 2016

Related U.S. Application Data

(63) Continuation-in-part of application No. PCT/CN2015/094835, filed on Nov. 17, 2015.

(30) Foreign Application Priority Data

Nov. 17, 2014    (CN) .......................... 2014 1 0653075
Nov. 17, 2014    (CN) .......................... 2014 1 0653321
Nov. 17, 2014    (CN) .......................... 2014 1 0655079

(51) Int. Cl.
     *B63B 1/34*        (2006.01)
     *B61D 17/02*      (2006.01)
     *B62D 35/00*      (2006.01)
     *B63G 8/04*        (2006.01)

(52) U.S. Cl.
CPC ................ *B63B 1/34* (2013.01); *B61D 17/02* (2013.01); *B62D 35/00* (2013.01); *B63G 8/04* (2013.01); *Y02T 70/121* (2013.01)

(58) Field of Classification Search
CPC .. B63B 1/34; B63G 8/045; B63G 8/04; B61D 17/02
See application file for complete search history.

(56) References Cited

U.S. PATENT DOCUMENTS

| | | | | |
|---|---|---|---|---|
| 2,969,759 | A * | 1/1961 | Giles ......................... | B63B 1/34 114/20.1 |
| 4,384,630 | A * | 5/1983 | Steiner ................... | B62D 35/00 180/7.1 |
| 6,450,111 | B1 * | 9/2002 | Cocksedge .............. | B60V 1/14 114/67 A |
| 8,545,279 | B2 * | 10/2013 | Cantemir ............... | B63H 11/14 440/38 |

* cited by examiner

*Primary Examiner* — Stephen P Avila
(74) *Attorney, Agent, or Firm* — Stein IP, LLC (57) ABSTRACT

The present invention provides a movement device comprising a shell, and an outer fluid channel and an inner fluid channel are sequentially formed in the shell; the outer fluid channel communicates with the outside through a plurality of first ports, and the inner fluid channel communicates with the outside through a plurality of second ports; flow disturbing devices concave and convex relative to the surface are arranged in the outer fluid channel; the pressure difference generated due to different flow speeds between the outer fluid channel and the inner fluid channel serves as the propelling force source of the movement device. A pressure difference transferring circle formed around the shell by the pressure difference between the inner layer and the outer layer is used by the present invention for increasing the traveling speed of the movement device.

19 Claims, 5 Drawing Sheets

MOVEMENT DEVICE CAPABLE OF GENERATING GREATER PROPELLING FORCE

CROSS-REFERENCE TO RELATED APPLICATIONS

This application is a continuation-in-part of International Application No. PCT/CN2015/094835, filed Nov. 17, 2015, which claims the benefit of priority to Chinese Application Nos. 201410655079.1, 201410653075.X, and 201410653321.1 all filed on Nov. 17, 2014, in the State Intellectual Property Office. All disclosures of the documents named above are incorporated in their entireties herein by reference.

BACKGROUND OF THE INVENTION

1. Field of the Invention

The present invention relates to a movement device driven by power, in particular to a movement device capable of generating greater propelling force.

2. Description of the Related Art

In the two hundred years since the Industrial Revolution to now, the basic theory and structure for movement devices driven by power to move rapidly in fluid to generate propelling force sources have never changed; no theory or method or device which can effectively overcome the fluid resistance is available. Consequentially, the actual energy utilization rate of existing movement devices such as automobiles, trains, ships and aircrafts is low.

Based on the fundamental core problem, existing from the Industrial Revolution, of the reason why power sources can be generated by propelling force, the present invention finds that the propelling force used for driving the movement devices to move in the prior art does not include all propelling force sources at all, and greater potential propelling force sources exist and are not utilized in space and time.

SUMMARY OF THE INVENTION

According to propelling force sources of the present invention, the fluid resistance is reduced by means of the pressure difference generated due to different flow speeds between an inner channel and an outer channel of a shell of a movement device, so that the purpose of saving energy is realized, and the propelling force sources of the present invention are obtained on this basis.

Since ancient times, according to the general common sense about dugout canoes driven by primitive people, arrows shot by the ancients and any existing movement device rapidly moving in fluid, the fluid on a shell of the movement device is distributed on an inner fluid layer and an outer fluid layer different from the inner fluid layer, wherein the inner layer flowing close to the surface of the shell is high in flow speed and serves as a high-speed layer; the flow speed is gradually decreased towards the outside till the wide-range outer layer which has the low flow speed equal to the environment flow speed, and the outer layer serves as a low-speed layer; the fluid pressure within a wider range in the outside around is completely guided to the outer low-speed layer from outside to inside by means of the high pressure generated by the outer low-speed layer, and the pressure difference is transferred to the low pressure generated by the high flow speed of the inner high-speed layer, so that more extra fluid pressure is generated without foundation, greater power has to be consumed to overcome the fluid resistance, a mutual contradiction result is generated, and consequentially most movement devices have to consume about 90% of power to overcome the fluid resistance. This is a new understanding about the generation of the fluid resistance of the present invention.

The present invention runs contrary to the general common sense in that the inner layer is the low-speed layer, the outer layer is the high-speed layer, and the high pressure generated by the inner low-speed layer transfers the pressure difference to the low pressure generated by the outer high-speed layer, so that fluid pressure of the movement device is guided to the outside; if 10% of the fluid pressure is transferred to the outside through the pressure difference generated due to different flow speeds between an inner channel and an outer channel, the propelling force sources of the movement device can be increased by at least about 50%; if 20% or 40% or 70% or even more fluid pressure is transferred to the outside, multifold propelling force sources can be obtained by the movement device, and in other words, the energy utilization rate of the movement device is multiplied.

The present invention aims to realize the technical purposes that the direction of the pressure difference, towards the outside, generated due to the different flow speeds between the inner channel and the outer channel of the shell of the movement device is opposite to the direction of the fluid pressure outside the shell, so that the pressure difference and the fluid pressure are mutually counteracted, the fluid resistance is reduced, energy is saved, and accordingly the propelling force sources are obtained.

According to one technical scheme adopted by the present invention for realizing the technical purposes:

A movement device comprises a shell and is characterized in that an outer fluid channel and an inner fluid channel are formed in part of the interior of the shell or the whole interior of the shell; the outer fluid channel communicates with the outside through a plurality of air ports, and the inner fluid channel communicates with the outside through a plurality of second air ports; flow disturbing devices which are concave and convex relative to the surface are arranged in the outer fluid channel, so that the pressure difference generated due to the different flow speeds between the outer fluid channel and the inner fluid channel serves as the propelling force source of the movement device.

According to another technical scheme provided by the present invention:

A movement device comprises a shell and a power device and is characterized in that an inner fluid channel and an outer fluid channel which communicate with the outside are formed in part of the interior of the shell or the whole interior of the shell; the outer fluid channel communicates with an air suction port of the power device, and the pressure difference generated due to the different flow speeds between the outer fluid channel and the inner fluid channel serves as the propelling force source of the movement device.

The technical schemes of the present invention run contrary to the general common sense in that the fluid pressure of the movement device is guided to the outside; a new understanding is given to the fluid resistance from a novel point of view that the pressure difference is generated due to the different flow speeds between the inner layer and the outer layer, the basic reason for the generation of the fluid resistance is found out on this basis, and thus novel propelling force sources are obtained.

A first propelling force source of the present invention is as follows:

An inner fluid layer and an outer fluid layer which have different flow speeds are formed around the movement device, and a power source can be obtained if the flow speed of the inner layer is lower than the flow speed of the outer layer; otherwise, power consumption is increased.

The greater the flow speed difference between the inner layer and the outer layer is, the greater the generated pressure difference is; the greater the flow speed of the inner layer is lower than the flow speed of the outer layer, the more the fluid resistance is reduced, and the more propelling force sources are obtained.

On the contrary, the greater the flow speed of an inner layer of a traditional movement device is higher than the flow speed of an inner layer of the traditional movement device, the more the fluid resistance is increased, the more power consumption is increased, and the one-to-one corresponding interrelation exists.

According to the present invention, the fluid pressure of the movement device is guided to the outside in the way that water flows to lower positions so as to conform to the natural law.

The fluid pressure within a wide range of the outside around is guided to the traditional movement device, so that it is obvious that the traditional movement device has to consume about 90% of power to overcome the fluid resistance.

A second propelling force source of the present invention is as follows:

The pressure difference generated due to the fact that the flow speed of the outer layer is even greater than the flow speed of the inner layer under the power action serves as the propelling force source of the movement device.

A third propelling force source of the movement device of the present invention is as follows:

The pressure difference generated between the positive pressure and the negative pressure of the front portion and the rear portion of the movement device serves as the propelling force source of the movement device.

The buoyancy force source generated for a ship of the present invention in the movement state is as follows:

The pressure difference generated between an upper high-speed area and a lower low-speed area of a shell, below a waterline, of the ship serves as the buoyancy force source.

The present invention has the beneficial effects that:

The inner fluid channel is formed in the shell of the movement device and generates fluid in a low-flow-speed and high-pressure area, the pressure difference is transferred to a high-flow-speed and low-pressure area generated by the outer fluid channel, so that a pressure difference transferring ring which surrounds the shell and is in the direction from inside to outside is formed, and the since the direction of the pressure difference is opposite to the direction of the fluid pressure in the outside, the pressure difference and the fluid pressure are mutually counteracted; the quantity of the obtained first propelling force source and the obtained second propelling force source is determined by the quantity of the counteracted fluid pressure; on this basis, the pressure difference generated between the positive pressure and the negative pressure of the front portion and the rear portion of the movement device is further found, and the pressure difference serves as the third propelling force source; accordingly, the pressure difference generated between the high-speed area and the low-speed area of the ship in the traveling process serves as the buoyancy force source.

BRIEF DESCRIPTION OF THE DRAWINGS

These and/or other aspects and advantages of the invention will become apparent and more readily appreciated from the following description of the embodiments, taken in conjunction with the accompanying drawings of which.

Description of the Marks

Shell—1; inner fluid channel—2; outer fluid channel—3; first port—4; second port—5; engine—6; communication pipe—7; flow disturbing device—8; waterline—9; control device—10; low-speed fluid layer—300; high-speed fluid layer—301; pressure difference transferring ring—302.

DETAILED DESCRIPTION OF THE EMBODIMENTS

For a detailed description of the technical contents and the realized purposes and effects of the present invention, the following description is given with the embodiments and the drawings.

The key conception of the present invention lies in that an inner fluid channel and an outer fluid channel which communicate with the outside are formed in a shell of a movement device, the pressure difference generated due to the fact that the flow speed of the inner layer is lower than the flow speed of the outer layer is used for reducing the fluid resistance, and propelling force sources are obtained therefrom.

Please see FIG. 1 to FIG. 10. The present invention provides the movement device which comprises the shell, and the outer fluid channel and the inner fluid channel are formed in the shell in sequence; the outer fluid channel communicates with the outside through a plurality of first ports, and the inner fluid channel communicates with the outside through a plurality of second ports; flow disturbing devices which are concave and convex relative to the surface are arranged in the outer fluid channel; the pressure difference generated due to the different flow speeds between the outer fluid channel and the inner fluid channel serves as a novel propelling force source of the movement device.

Furthermore, the inner fluid channel communicates with the outer fluid channel through the second ports, and the opening areas of the first ports are greater than the opening areas of the second ports.

Furthermore, the inner fluid channel communicates with the first ports through communication pipes; the opening areas of the first ports are greater than the opening areas of the second ports.

Furthermore, the outer fluid channel and the inner fluid channel are formed in part of the interior of the shell or in the whole interior of the shell.

Furthermore, the inner fluid channel is formed in the outer fluid channel and is of a hollow tubular structure, and the flow disturbing devices are arranged on the outer wall of the hollow tubular structure in a surrounding mode to lengthen the path of the fluid passing through the outer fluid channel.

Furthermore, the flow disturbing devices are flow disturbing surfaces or spiral flow disturbing surfaces or spiral flow disturbing strips which lengthen the path of the fluid passing through the outer fluid channel and are concave and convex relative to the surface.

Furthermore, the movement device is an automobile or a train.

Furthermore, the movement device is a ship, and the outer fluid channel and the inner fluid channel are formed in the shell below a ship waterline.

Furthermore, the movement device is a submarine, and the inner fluid channel and the outer fluid channel form a water storage bin of the submarine.

According to another technical scheme provided by the present invention:

A movement device comprises a shell and an engine, and an outer fluid channel and an inner fluid channel which communicate with the outside are formed in the shell in sequence; the outer fluid channel communicates with a suction port of the engine, and the pressure difference generated due to the different flow speeds between the outer fluid channel and the inner fluid channel serves as the propelling force source of the movement device.

Furthermore, the outer fluid channel communicates with the outside through a plurality of first port, and the inner fluid channel communicates with the outside through a plurality of second ports; the opening areas of the first ports are greater than the opening areas of the second ports.

Furthermore, the inner fluid channel communicates with the outer fluid channel through the second ports.

Furthermore, the inner fluid channel communicates with the first ports through communication pipes; the opening areas of the first ports are greater than the opening areas of the second ports.

Furthermore, the outer fluid channel and the inner fluid channel are formed in part of the interior of the shell or the whole interior of the shell; the inner fluid channel is formed in the outer fluid channel and is of a hollow tubular structure.

Furthermore, control devices which can control opening and closing and control the flow are arranged at the first ports.

Furthermore, the movement device is an automobile.

Furthermore, the movement device is a train.

Furthermore, the movement device is a ship, and the outer fluid channel and the inner fluid channel are formed in the shell below the waterline of the ship.

Furthermore, the movement device is a submarine, and the inner fluid channel and the outer fluid channel form a water storage bin of the submarine.

Furthermore, the outer fluid channel and the inner fluid channel are formed in the front portion or the front half portion of the shell of the movement device; the first ports communicate with the suction port of the engine arranged in the rear portion of the shell, a nozzle of the engine is arranged on the rear portion of the shell, and the pressure difference generated between the front portion or the front half portion of the shell and the rear portion of the shell serves as a propelling force source.

A first embodiment: Please see FIG. 1 to FIG. 3, an outer fluid channel 3 and an inner fluid channel 2 are formed in the whole interior or part of the interior of a shell 1 below the waterline 9 of a ship, the outer fluid channel 3 communicates with the outside through a plurality of first ports 4 in the shell 1, and the inner fluid channel 2 communicates with the outside through communication pipes 7 and a plurality of second ports 5 in the shell 1; the first ports 4 of the outer fluid channel 3 communicate with a water suction port of an engine 6 arranged in the tail of the ship. The areas of the first ports 4 are greater than the areas of the second ports 5.

Since the density of water is about eight hundred times that of air, 90% of power is generally consumed for overcoming the fluid resistance when the ship travels, and consequentially the traveling speed of the ship is extremely low and energy consumption is extremely high. The basic reason lies in that the fluid close to the periphery of a ship body is an inner high-speed layer with the flow speed equal to the ship speed, and the flow speed is gradually decreased towards the outside till an outer low-speed layer with the environment flow speed within a wide range; in this way, the pressure difference from outside to inside is generated between the outer layer with the low flow speed and the inner layer with the high flow speed, so that the high pressure generated by the outer layer with the low environment flow speed within a wide range definitely transfers the pressure difference to the low pressure generated by the inner layer with the high flow speed, and accordingly more extra fluid pressure generated without foundation completely and directly acts on the ship body, and the ship has to consume 90% of power to overcome the fluid resistance.

Figure 1:
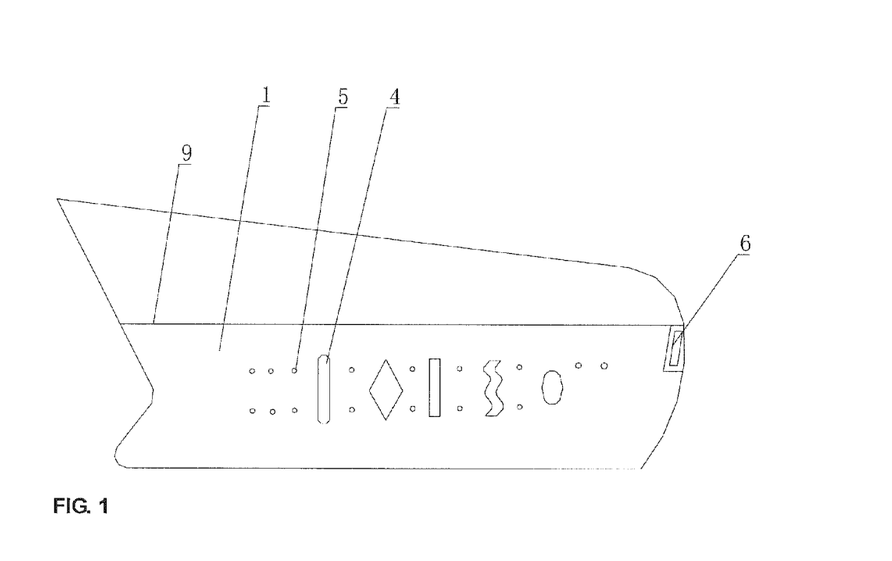
FIG. 1 is a structural schematic diagram of a ship in one embodiment of the present invention.
Figure 2:
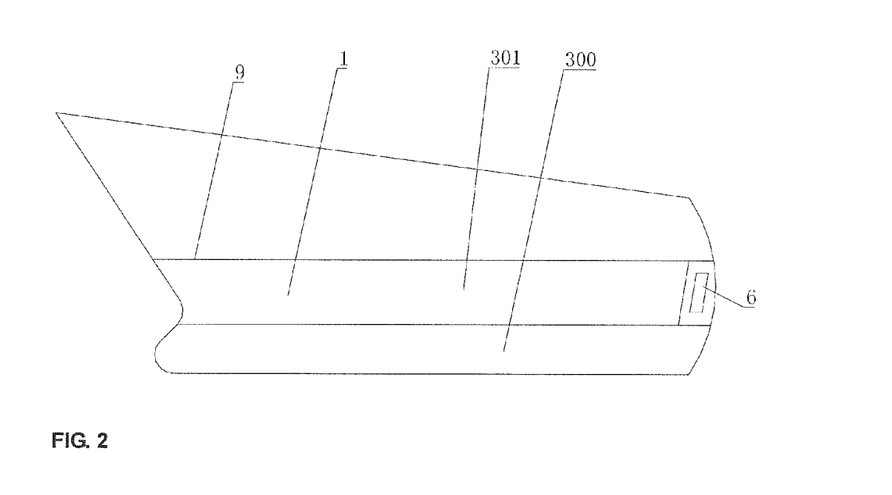
FIG. 2 is a section-view structural schematic diagram of the ship in the embodiment of the present invention.
Figure 3:
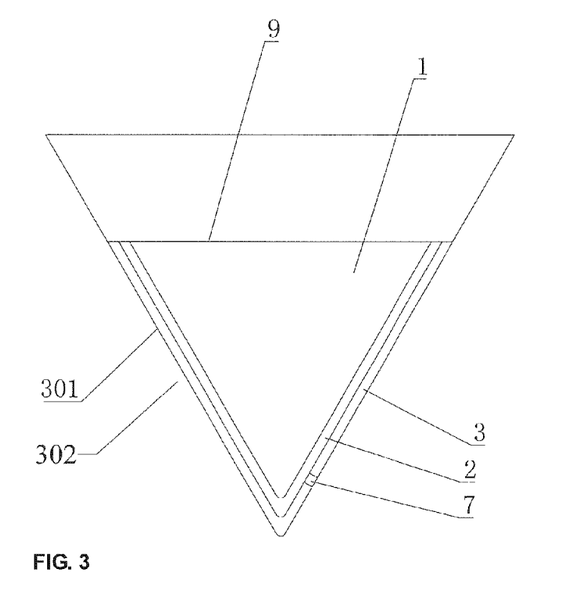
FIG. 3 is a structural schematic diagram of a ship in another embodiment of the present invention.

According to the present invention, when the ship travels, the fluid enters the outer fluid channel 3 and the inner fluid channel 2 from the first ports 4 and the second ports 5 in the shell 1 correspondingly, and since the areas of the first ports 4 are much greater than the areas of the second ports 5 and the flow speed of the inner fluid channel 2 in the natural state is made lower through a plurality of communication pipes 7 with small areas, the flow speed of the inner fluid channel 2 is even lower than the flow speed of the fluid outside the shell 1 in the natural state.

At the moment, the engine 6 communicates with the multiple large first ports 4 in the shell 1 through the outer fluid channel 3, so that the outer fluid channel 3 is made to suck the fluid on the shell 1 into the outer fluid channel 3 from the peripheries of the multiple first ports 4 at a high speed in the strong suction state of the engine 6, accordingly an inner high-speed fluid layer 301 and an outer high-speed fluid layer 301 which communicate with each other and have the approximately equal flow speeds are formed in the shell 1 and in the outer fluid channel 3 under the power action, and the flow speeds of the high-speed fluid layers 301 are much higher than the flow speed in the inner fluid channel 2 in the natural state and the flow speed even lower than the flow speed in the natural state; in this way, a high water pressure area generated by the low flow speed in the inner fluid channel 2 definitely transfers the pressure difference to low pressure areas generated by the high flow speeds on the high-speed fluid layers 301 through the communication pipes 7 via the multiple small second ports 5 evenly distributed in the shell 1, so that a pressure difference transferring ring 302 from inside to outside is formed on the shell 1 in a surrounding mode, the direction of the pressure difference is opposite to the direction of the pressure, from outside to inside, generated by the fluid outside the periphery of the ship, the two fluid pressures in different directions encounter on the shell 1 and are mutually counteracted, certain quantity of fluid resistance is subtracted from the fluid pressure according to the quantity of the counteracted pressure, and accordingly the traveling speed of the ship is increased to a certain extent; meanwhile, a second propelling force source of a certain quantity is obtained according to the quantity of reduced energy consumption. The greater the flow speed difference between the inner fluid channel and the outer fluid channel is, the greater the generated pressure difference is, and the greater the quantity of reduced fluid resistance is.

Due to the fact that the flow speed in the outer fluid channel 3 in the strong suction state of the engine 6 is much higher than the flow speed of the inner fluid channel 2 in the natural state and the flow speed even smaller than the flow speed in the natural state, it is obvious that the flow speed in the narrow channel can be increased by several times and even over ten times easily by controlling the engine 6; in this way, over ten times of pressure difference is generated due to the great flow speed difference between the inner channel and the outer channel, and part and even most part of the fluid resistance is transferred to the outside through the pressure difference transferring ring 302; the current situation that according to a traditional ship, about 90% of energy is consumed for overcoming the fluid resistance, and only 10% of power is used for driving the ship to travel is changed; if the fluid resistance can be reduced by 10%, the ship at least obtains over 50% of the propelling force sources through second propelling force; if 20% or 40% or 70% or even more fluid pressure is transferred to the outside, multifold propelling force sources can be obtained by the movement device; in fact, if over ten times of pressure difference is generated between the inner channel and the outer channel, the fluid resistance is reduced by over 10% rather than only 10%. The ship which is novel in structure, higher in speed and lower in energy consumption is obtained through the second propelling force.

Furthermore, see FIG. 2, the high-speed fluid layers 301 are arranged in the upper area of the shell 1 below the waterline 9 of the ship, the high-speed fluid layers generated in the strong suction state of the engine 6 are high-speed areas 301, and a low-speed layer 300 is formed by low-speed fluid on the lower portion and the peripheral area of the ship; in the traveling process of the ship, the pressure difference from bottom to top is generated due to the difference between the high flow speeds of the high-speed areas 301 and the low flow speed of the low-speed area 300, and the pressure difference serves as buoyancy force; the greater the pressure difference between the high-speed areas 301 and the low-speed area 300 is, the greater the generated buoyancy force is; through the pressure difference generated in the movement state, the buoyancy force of the ship is increased, and the speed of the ship is increased; the buoyancy force source generated in the movement state of the ship of the present invention is as follows:

The pressure difference generated between the upper high-speed areas and the lower low-speed area of the shell, below the waterline, of the ship serves as the buoyancy force source.

Furthermore, the high-speed fluid layers 301 are arranged on the front portion of the shell of the ship, and the outer fluid channel communicates with a suction port of the engine 6 arranged on the rear portion of the shell through a channel; a high negative pressure area is formed on the front portion of the shell in the strong suction state of the engine 6, a high positive pressure propelling area is generated through water spraying of the engine 6 on the rear portion of the shell, and an extremely large pressure difference is formed between the high negative pressure and the high positive pressure of the front portion and the rear portion of the ship; the fluid around the ship is integrally continuous, so that no matter how long the ship body is, the high positive area on the rear portion definitely transfers the pressure difference to the high negative area on the front portion of the shell along the ship body from back to front through the continuity of the fluid, and accordingly the pressure difference between the extremely-high positive pressure and the extremely-high negative pressure formed on the front portion and the rear portion of the movement device is formed; the greater the difference between the positive pressure and the negative pressure is, the greater the generated pressure difference propelling force is, and thus a third propelling force source of the present invention is as follows:

The pressure difference generated between the positive pressure and the negative pressure of the front portion and the rear portion of the movement device serves as the propelling force source of the movement device.

A second embodiment: See FIG. 3, based on the first embodiment, a plurality of small second ports 5 can be evenly formed in the whole inner wall or part of the inner wall between the inner fluid channel 2 and the outer fluid channel 3, and the second ports 5 communicate with the interior of the outer fluid channel 3; if the second ports 5 are formed in part of the inner wall, the other parts such as the inner fluid channel in the first embodiment communicate with the second ports 5 in the shell through the communication pipes 7; the two ways can be set independently or simultaneously; in addition, barriers can also be arranged in the inner fluid channel to make the flow speed of the inner fluid channel even lower, and accordingly an ever greater pressure difference is generated between the inner fluid channel and the outer fluid channel.

When the ship travels, the fluid enters the inner channel 2 and the outer channel 3; since the areas of the multiple first ports 4 evenly distributed in the shell 1 are much greater than the areas of the second ports 5, under the strong suction of the engine 6, a large quantity of fluid in the outside is naturally sucked into the outer fluid channel 3 from the first ports 4, so that a high-speed fluid layer 301 is formed; the low-flow-speed and high-water-pressure fluid pressure in the inner fluid channel 2 transfers the pressure difference to a high-flow-speed and low-water-pressure area of the high-speed fluid layer 301 from the multiple small second ports 5 which are evenly distributed, so that an even greater pressure difference transferring area 302 surrounding the ship body by one circle is formed, and accordingly the ship can obtain a second propelling force source during traveling and the fluid resistance is reduced.

Furthermore, based on the above embodiment, the engine 6 is removed, and flow disturbing devices which are concave and convex relative to the surface are arranged in the outer fluid channel of the ship; the path of the fluid passing through the outer fluid channel can be lengthened by the flow disturbing devices and is much longer than the path of the inner fluid channel, so that the pressure difference is generated, a pressure difference transferring area 302 surrounding the ship body by one circle is formed, and accordingly a first propelling force source is obtained under the power-free condition.

A third embodiment: See FIG. 4, according to a submarine, an inner fluid channel and an outer fluid channel are formed in a shell 1 in a surrounding mode, an engine 6 arranged in the tail portion of the shell 1 communicates with first air ports 4 through the outer fluid channel 3, and the inner fluid channel 2 communicates with second air ports 5 through communication pipes 7; the inner fluid channel and the outer fluid channel form a water storage bin of the submarine, a water suction port of a power device communicates with the outer fluid channel, and a nozzle of the power device communicates with the outside, so that propelling force is generated; due to the fact that the fluid in the water storage bin flows along with the fluid around when the submarine travels, the weight of the water storage bin is counteracted, corresponding energy consumption is reduced, and the propelling force of the submarine is remarkably improved.

Figure 4:
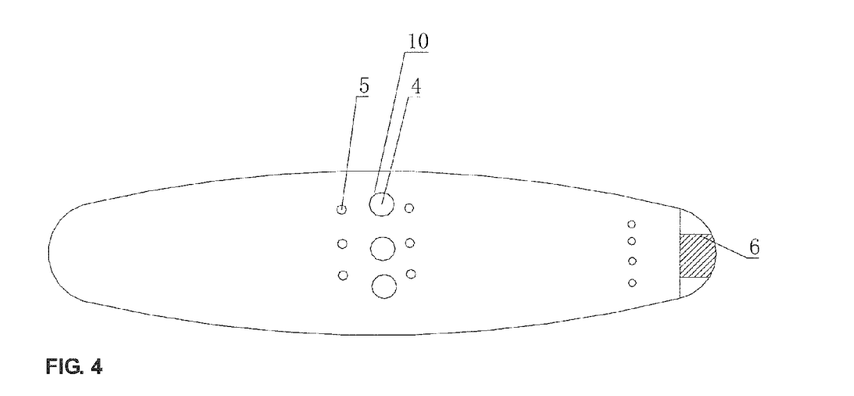
FIG. 4 is a structural schematic diagram of a submarine in one embodiment of the present invention.

When the submarine travels, an extremely large fluid resistance is generated deep in water, and the fluid resistance is almost the unique factor influencing the speed of the submarine. Through the strong suction of the engine 6, the fluid is sucked into the outer fluid channel 3 from the multiple first air ports 4 at a high speed, so that a high-speed fluid layer 301 is formed, and an over ten times of pressure difference transferring ring 302 is easily formed between the high-speed fluid layer 301 and the inner fluid channel 2 in a natural state or in a state making the flow speed even lower than the flow speed in the natural state and surrounds the submarine, and it is obvious that if the fluid resistance can be reduced by 10%, the submarine at least obtains over 50% of propelling force sources through second propelling force; through the over ten times of pressure difference, the fluid resistance is reduced by over 10% rather than only 10%, so that the speed of the submarine is increased, energy consumption is obviously reduced, and the novel high-speed submarine is obtained.

A fourth embodiment: based on the third embodiment, a plurality of small second air ports 5 can be evenly formed in part of the inner wall (or the whole inner wall) between the inner fluid channel 2 and the outer fluid channel 3 and communicate with the interior of the outer fluid channel 3, and the other parts such as the inner fluid channel in the first embodiment communicate with the second air ports 5 in a shell through communication pipes 7; control devices 10 used for controlling opening, closing and angle change are arranged in the first air ports 4, and the pressure difference is generated on the upper portion, the lower portion, the left portion and the right portion or the local part of the shell 1 of the submarine through the control devices 10 for controlling opening or closing and angle change so that the submarine can rise, fall and steer; in addition, the inner fluid channel 2 and the outer fluid channel 3 are made to form a water storage bin jointly by controlling all the first air ports 4 to be closed, and accordingly the precious space of the interior of the submarine is greatly saved.

Furthermore, the outer fluid channel 3 does not communicate with the engine; flow disturbing devices which are concave and convex relative to the surface are arranged in the outer fluid channel 3 to lengthen the path of the fluid passing through the outer fluid channel 3, and the flow speed of the outer fluid channel is made different from the flow speed of the inner fluid channel, so that the pressure difference is generated, and a pressure difference transferring area 302 surrounding the submarine by one circle is formed; the greater the flow speed difference between the inner channel 2 and the outer channel 3 is, the greater the generated pressure difference is, and the greater the obtained first propelling force source is.

A fifth embodiment: See FIG. 5 to FIG. 7, an inner fluid channel 2 and an outer fluid channel 3 surrounding a high-speed train are formed in a shell 1 of the high-speed train, and the inner fluid channel 2 and the outer fluid channel 3 communicate with the outside through second ports 5 of the inner fluid channel 2 and first ports 4 of the outer fluid channel 3 correspondingly; the outer fluid channel 3 communicates with an air suction port of an engine 6 arranged on the rear portion of the shell 1 of the train, and an exhaust port of the engine 6 communicates with the outside, so that propelling force driving the train to travel is generated; the air inlet areas of the first ports 4 are greater than the air inlet areas of the second ports 5, and the engine 6 includes a turbofan engine or a jet engine and the like and has an air suction function and an air injection function.

Figure 5:
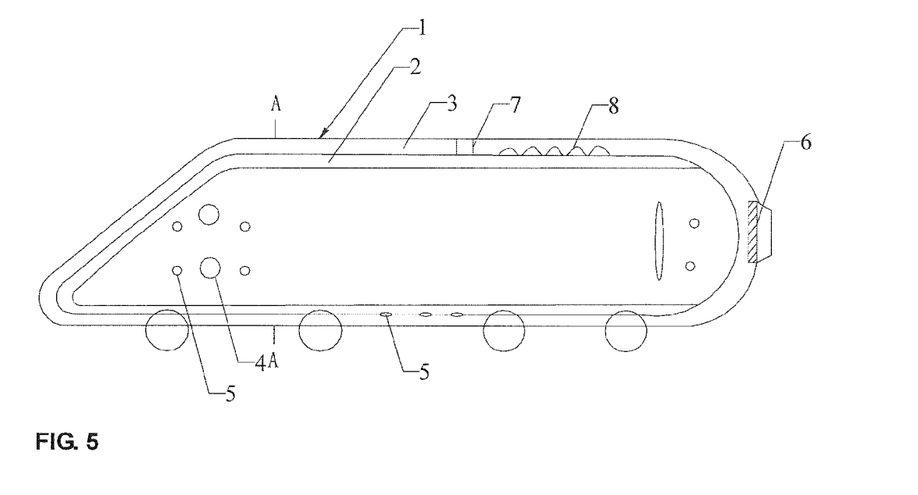
FIG. 5 is a front view of a high-speed train in one embodiment of the present invention.
Figure 6:
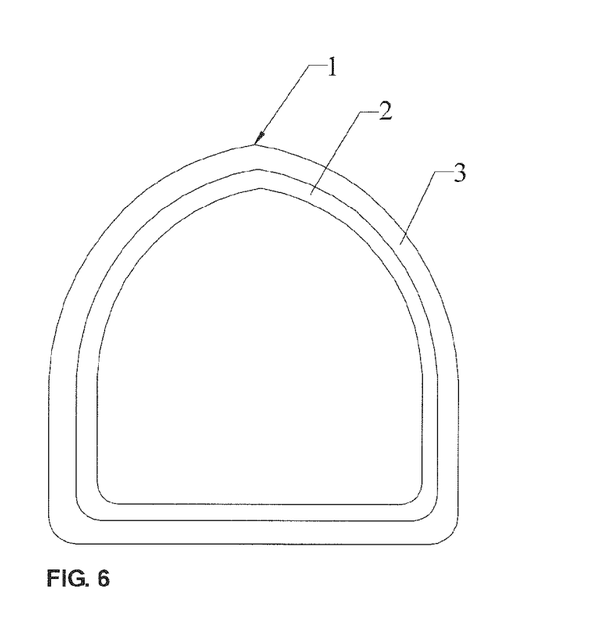
FIG. 6 is a view of an A-A section in FIG. 5.
Figure 7:
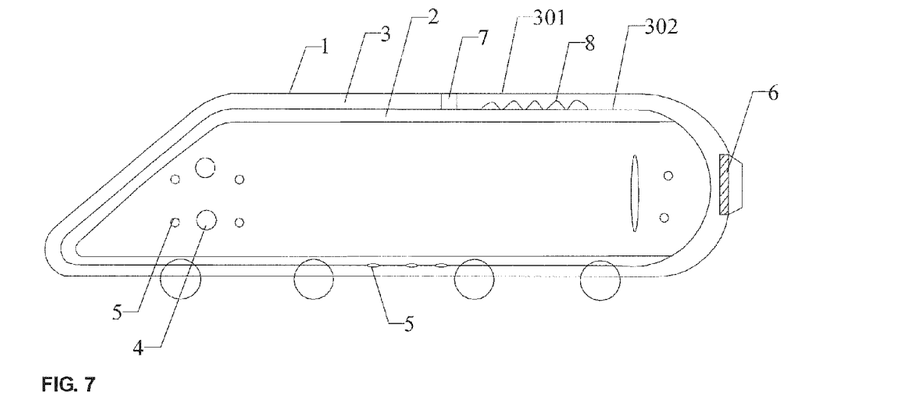
FIG. 7 is a structural schematic diagram of the high-speed train in the embodiment of the present invention.

When the train travels, the strong suction generated by the engine 6 sucks the fluid on the shell 1 into the outer fluid channel 3 at a high speed through the multiple first air ports 4 which are evenly distributed in the upper side, the lower side, the left side and the right side of the periphery of the shell, so that the flow speed in the shell 1 and the flow speed in the outer fluid channel 3 are made extremely high, and accordingly a high-speed fluid layer 301 is formed by the shell 1 and the outer fluid channel 3 jointly, and the pressure difference is generated between the high flow speed of the high-speed fluid layer 301 and the low flow speed in the inner fluid channel 2 in the natural state or even the flow speed lower than the flow speed in the natural state under the unsmooth flowing condition; in this way, the high pressure generated by the low flow speed in the inner fluid channel 2 transfers the fluid pressure from outside to inside through the multiple second ports 5 with small air inlet areas, a pressure difference transferring ring 302 is formed, and the pressure difference serves as the propelling force and reduces the fluid resistance.

Generally, the speed of the high-speed train can reach about 350 kilometers per hour, it is quite difficult to further increase the speed of the high-speed train, the most important reason is the fluid resistance, and meanwhile the higher the speed is, the greater the resistance is, and the greater the energy consumption is.

According to the present invention, if the pressure difference generated between the inner fluid channel and the outer fluid channel is increased, the speed of the train can be increased, the energy consumption of the train can be reduced, and the power sources obtained by the train are increased correspondingly. In this way, the greater the generated pressure difference is, the higher the speed of the train is, and the more the obtained power sources are; control over the pressure difference transferring ring 302 is achieved by controlling the engine 6, and accordingly control over the speed of the train and the propelling force sources obtained by the train is achieved; furthermore, through the reasonable design of a rail, the inner fluid channel, the outer fluid channel, the second ports 5 and the first ports 4, the speed of the train can be remarkably increased quite easily.

Preferably, the quantity of the pressure difference generated between the inner channel and the outer channel is controlled by controlling the engine 6 and controlling the flow speed in the outer fluid channel 3, accordingly the quantity of the resistance transferred by the pressure difference transferring ring 302 is controlled, the influence of the fluid resistance on the traveling of the train is controlled, control over the speed of the train is achieved, meanwhile the quantity of second propelling force obtained by the train is controlled, and the one-to-one corresponding control relation exists; a regular corresponding relation is provided for the design and development of the train, and thus the serial high-speed energy-saving train is obtained on this basis.

Preferably, control devices 10 which can controlling opening or closing or angle change of the first ports 4 are arranged on the first ports 4, and control is conducted according to specific requirements; if the first ports 4 in the upper portion of the train are closed, the flow speed of the bottom of the train is made higher than the flow speed of the upper portion of the train, so that the lift force of the train disappears, the ground holding force is stronger, and the train is safer when traveling at a high speed or steering.

Preferably, when the front portion and the rear portion of the train are commonly known as bullet heads of the shell 1, engines 6 can be arranged on the head portions of the bullet heads of the front portion and the rear portion correspondingly and communicate with the outer fluid channel 3; when the rain travels in the opposite direction, the rear portion serves as the front portion, and an air inlet of the engine 6 on the rear portion can be sealed.

A sixth embodiment: Based on the fifth embodiment, the engine 6 is removed; flow disturbing surfaces or spiral flow disturbing strips or other flow disturbing surfaces which are concave and convex relative to the surface are arranged in the outer fluid channel 3, and at least one of the various flow disturbing surfaces can be adopted; scale structures and feather structures can also be simulated, scale flow disturbing pieces and feather flow disturbing pieces are used for further lengthening the path of the fluid passing through the outer fluid channel 3, and the path of the fluid passing through the outer fluid channel 3 is made even greater than the path of the fluid passing through the inner fluid channel 2, so that the pressure difference is generated. The train can be driven by various kinds of traditional power.

When the high-speed train travels, the fluid enters the inner fluid channel 2 and the outer fluid channel 3 from the second ports 5 and the first ports 4; since the air inlet areas of the first ports 4 are much greater than the air inlet areas of the second ports 5, more fluid enters the outer fluid channel 3, and the path of the fluid passing through the outer fluid channel 3 is lengthened through the flow disturbing surfaces.

Preferably, bar-shaped spiral flow disturbing strips, with the outer surfaces being concave and convex relative to the surface, formed by flow disturbing surfaces or spiral flow disturbing surfaces are adopted, the multiple spiral flow disturbing strips are evenly distributed in the outer fluid channel 3; due to the special structures of the spiral flow disturbing surfaces, fluid is made to pass through the outer fluid channel 3 circle by circle, and accordingly the path of the fluid passing through the outer fluid channel 3 is made over two times longer than the path of the fluid passing through the inner fluid channel 2 quite easily, and an even greater pressure difference is generated.

Furthermore, the inner fluid channel is formed in the outer fluid channel; preferably, the spiral flow disturbing strips are hollow and are hollow flow disturbing pipes, the inner fluid channel is formed in the hollow pipes, parts of the hollow pipes or the whole hollow pipes communicate with the outer fluid channel 3 through the multiple second ports 5, the other parts of the hollow pipes communicate with the multiple second ports 5 in the shell through communication pipes 7, and flow disturbing devices are the concave-convex flow disturbing surfaces or spiral flow disturbing surfaces and arranged on the external peripheries of the hollow pipes in a surrounding mode, so that the path of the fluid passing through the outer fluid channel is lengthened; in this way, a multifold pressure difference transferring ring 302 is formed between the inner channel and the outer channel, more fluid resistance is transferred to the outside, and accordingly a first propelling force source is obtained.

A seventh embodiment: See FIG. 8 to FIG. 10, an automobile comprises a shell 1, an inner fluid channel and an outer fluid channel 3 are formed in the shell 1, and the inner fluid channel and the outer fluid channel 3 communicate with the outside through second ports 5 and first ports 4, formed in the shell 1, of the inner fluid channel and the outer fluid channel correspondingly; flow disturbing surfaces which are concave and convex relative to the surface and in one shape or various shapes are arranged in the outer fluid channel 3 to lengthen the path of fluid passing through the outer fluid channel 3, and the path of the fluid passing through the outer fluid channel 3 is made longer than the path of the fluid passing through the inner fluid channel; the air inlet areas of the first ports 4 are greater than the air inlet areas of the second ports 5.

Figure 8:
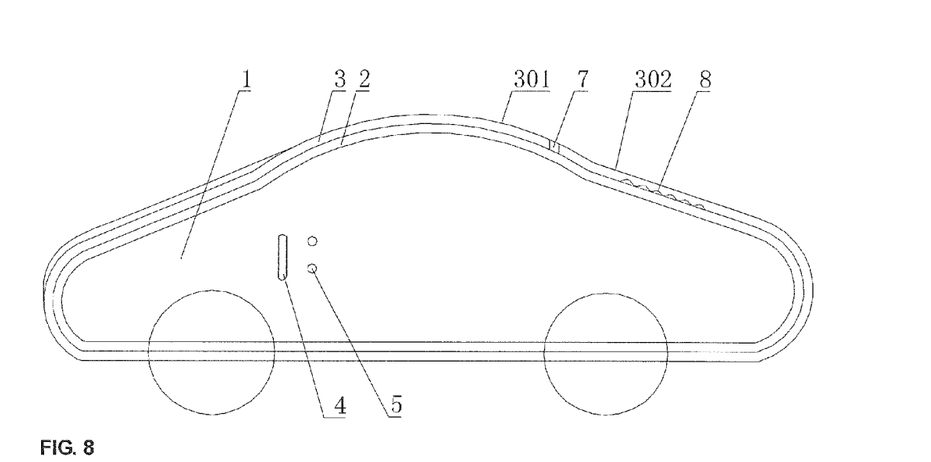
FIG. 8 is a structural schematic diagram of an automobile in one embodiment of the present invention.
Figure 9:
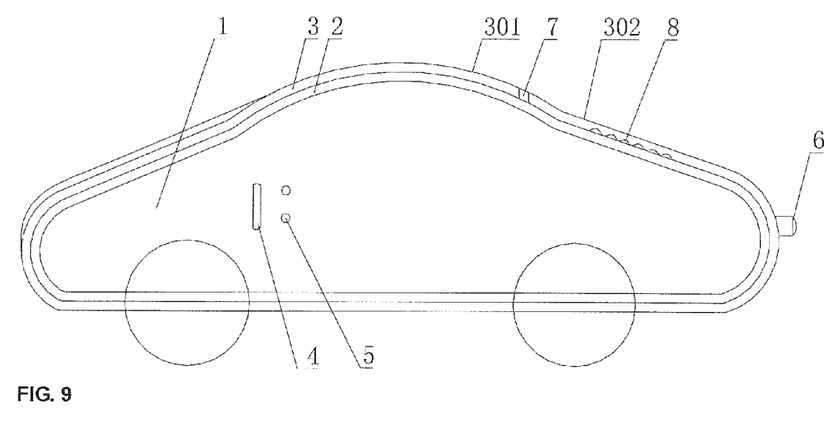
FIG. 9 is a structural schematic diagram of an automobile in one embodiment of the present invention.
Figure 10:
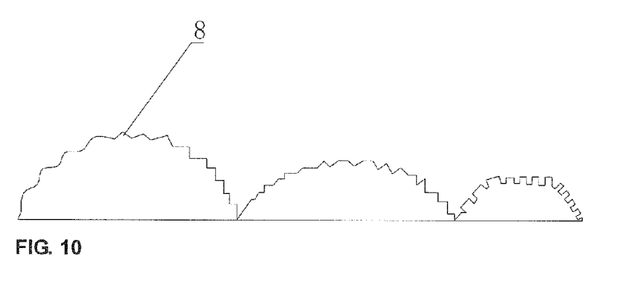
FIG. 10 is a schematic diagram of flow disturbing surfaces of the automobile in the embodiment of the present invention.

When the automobile is driven by power to travel at a high speed, the fluid with the flow speed equal to the automobile speed enters the inner fluid channel 2 and the outer fluid channel 3 form the first ports 4 and the second air ports 5; since the air inlet areas of the first ports 4 are much greater than the air inlet areas of the second ports 5, a large quantity of fluid with the flow speed equal to the automobile speed enters the outer fluid channel 3 from the multiple first ports 4 which are evenly distributed; Since the arc-shaped flow disturbing surfaces which are concave and convex relative to the surface are arranged in the outer fluid channel 3, the path of the fluid passing through the outer fluid channel 3 is lengthened, the flow speed of the fluid in the outer fluid channel 3 is made even higher than the automobile speed, and then the fluid enters the outer fluid channel 3 more rapidly from the multiple first air ports 4 which are evenly distributed in the shell 1, so that two high-speed fluid layers 301 with approximately equal flow speeds are formed in the outer fluid channel and on the shell 1; pressure difference is generated between the high-speed fluid layers 301 and the inner fluid channel which communicates with the second ports 5 with the small air inlet areas through communication pipes 7 and has the flow speed lower than the automobile speed due to unsmooth flowing due to the different flow speeds, so that the pressure difference is transferred to the low pressure generated by the high flow speeds on the high-speed fluid layers 301 by the high pressure generated in the inner fluid channel due to the low flow speed from inside to outside through the second ports 5 which are evenly distributed on the shell 1, and accordingly a pressure difference transferring ring 302 surrounding the automobile is formed on the upper portion, the lower portion and the peripheries of the two sides of the shell 1 in a surrounding mode; the pressure difference is transferred in the direction opposite to the fluid resistance acting on the shell 1 from outside to inside when the automobile travels from inside to outside, so that the fluid resistance is reduced and correspondingly converted into the first propelling force source of the automobile. If the greater the flow speed difference between the inner fluid channel and the outer fluid channel is, the greater the generated pressure difference is, the pressure difference is propelling force, and thus more first propelling force sources can be obtained.

Furthermore, as is shown in FIG. 10, the arc surface of each flow disturbing surface which is concave and convex relative to the surface can further be composed of a plurality of smaller arcs or a plurality of small triangles or a plurality of small trapezoids or squares, so that the path of the fluid passing through the outer fluid channel 3 is doubled and even is lengthened by multiple times, and accordingly a greater pressure difference is generated between the inner fluid channel and the outer fluid channel.

Furthermore, a plurality of arc-shaped flow disturbing strips are arranged in the outer fluid channel 3; since the height direction in the outer fluid channel 3 is limited, the radian of the arc-shaped flow disturbing strips is not large; since the space in the length direction of the outer fluid channel 3 and the space in the width direction of outer fluid channel 3 are large, a plurality of concave-convex arc-shaped channels with the large radian are formed in the outer fluid channel in the length direction and the width direction by the multiple arc-shaped flow disturbing strips with the lower surfaces being planes and the upper surfaces being arc-shaped surfaces, and accordingly the path of the fluid passing through the outer fluid channel is further lengthened; preferably, the lower surfaces of the arc-shaped flow disturbing strips are connected with an inner shell.

Furthermore, a plurality of bar-shaped spiral flow disturbing strips with the spiral outer surfaces are arranged in the outer fluid channel 3, and through the spiral special structures, the path of the fluid passing through the outer fluid channel 3 is further doubled.

Furthermore, the arc-shaped flow disturbing strips or the spiral flow disturbing strips or the flow disturbing surfaces are in the shape of being concave and convex relative to the surface, are formed by hollow flow disturbing pipes, and evenly or unevenly arranged in the longitudinal direction or in the transverse direction, so that water ripple surfaces are formed; through long-term observation of the inventor, the water ripple surfaces are characterized in that the water ripple surfaces are unevenly distributed on concave parts or convex parts in the longitudinal direction or in the transverse direction, the irregular water ripple flow disturbing surfaces are the best flow disturbing structures, and accordingly the fluid is made to pass through the outer fluid channel smoothly, and the resistance is extremely small.

At the moment, since the flow speed of the inner fluid channel is several times lower than the flow speed of the outer fluid channel 3, a high-speed fluid layer 301 is formed, and accordingly a pressure difference transferring ring 302 surrounding the automobile by one circle is formed; through the multiplied pressure difference, the fluid pressure exerted on the shell 1 of the automobile by the fluid is transferred from inside to outside, and accordingly part of the fluid resistance or even most fluid resistance is transferred to the outside to be converted into a first propelling force source of the automobile.

Through the reasonable design of the relation of the inner fluid channel, the outer fluid channel, the flow disturbing surfaces, the flow disturbing strips and the air ports, more first propelling force sources can be obtained, and thus the automobile remarkable in energy saving effect is obtained.

An eighth embodiment: An automobile is different from the above automobile in that the flow disturbing devices 8 are removed; the inner fluid channel and the outer fluid channel communicate with the shell 1 through a plurality of second ports 5 and a plurality of first ports 4, and the air inlet areas of the first ports 4 are much greater than the areas of the second ports 5; the second ports 5 further communicate with the portion, behind the outer fluid channel, of the inner fluid channel through communication pipes 7 with small calibers, or part of the second ports 5 or all the second ports 5 communicate with the outer fluid channel; barriers used for unsmooth flowing of the fluid in the inner fluid channel are arranged in the inner fluid channel, the flow speed which is lower than the automobile speed or even lower than the flow speed in the outer fluid channel 3 is formed in the inner fluid channel 2 due to the unsmooth flowing of the fluid in the inner fluid channel 2, so that the pressure difference is generated, and accordingly a pressure difference transferring ring 302 is formed. As the improvement of the seventh embodiment, another outer fluid channel which communicates with the outside is further arranged on the surface of the shell 1, flow disturbing surfaces are arranged in the outer fluid channel to make the path of the fluid passing through the outer fluid channel longer than the path of the fluid passing through the corresponding outer fluid channel 3 on the inner layer and even longer than the path of the fluid passing through the inner fluid channel, so that the pressure difference, transferred from inside to outside layer by layer, between high pressure and low pressure is generated, a pressure difference transferring ring 302 is formed around the automobile, and the fluid resistance during traveling of the automobile is reduced.

In the same way, two inner fluid channels are arranged and communicate with the outer fluid channels and the outside, so that the pressure difference which is transferred from high pressure to low pressure layer by layer is generated, and accordingly more first propelling force sources are obtained.

Furthermore, at least one inner fluid channel communicating with the outside is arranged.

As an improvement of the seventh embodiment, the eighth embodiment is different from the seventh embodiment in that a power device, such as an air suction motor or a small-power engine, with an air suction function and an air injection function is arranged in the tail portion of an automobile body, an air suction port of the power device communicates with the outer fluid channel 3, and an air injection port of the power device communicates with the outside. When the automobile travels, strong suction force generated by the power device sucks the fluid into the outer fluid channel 3 at a high speed from the multiple first ports 4 evenly distributed in the shell 1, so that high-speed fluid layers 301 are formed in the outer fluid channel and on the shell 1, an extremely large pressure difference is generated between the high-speed fluid layers 301 and the inner fluid layer 2, then a pressure difference transferring ring 302 surrounding the automobile by one circle is formed, and accordingly a second propelling force source of the automobile is obtained; meanwhile, the fluid sucked into the outer fluid channel is sprayed out backwards from the power device at a high speed, and the automobile is helped to travel rapidly in a more energy-saving mode.

If the power of an air suction motor is high enough, the air suction motor can serve as a propelling force source of the automobile, and in this way, a power system and a transmission system of the automobile are made simpler. Meanwhile, through the strong suction force of the air suction motor, the flow speed in the outer fluid channel 3 can be made over ten times the flow speed of the inner fluid channel 2 quite easily, so that a greater pressure difference is generated; the pressure difference is propelling force, the automobile obtains a greater second propelling force source through the propelling force, and thus the novel energy-saving automobile is obtained. The power device can also be a small turbofan engine 6 or a jet engine 6.

In conclusion: The present invention finds propelling force sources suitable for any movement device for the first time based on the fundamental core problem, existing since the ancient times, of the reason why power sources can be generated by propelling force.

'An inner fluid layer and an outer fluid layer which have different flow speeds are formed around the movement device: if the flow speed of the inner layer is lower than the flow speed of the outer layer, the power sources are obtained; otherwise, power consumption is increased.'

The present invention runs contrary to the general common sense in that the fluid pressure of the movement device is guided to the outside around in the way that water flows to lower positions and conforms to the natural law, so that the fluid pressure is converted into the first propelling force source and the second propelling force source of the movement device; on this basis, it is found that the pressure difference generated between the positive pressure and the negative pressure of the front portion and the rear portion of the movement device serves as the third propelling force source; it is further found that the pressure difference generated between the high-speed area and the low-speed area during traveling of the ship serves as the buoyancy force source.

The present invention will have far-reaching influences on the energy utilization rate and the future development of the power device.

The forgoing description is only the embodiments of the present invention and does not limit the patent scope of the present invention, all equivalent transformation made according to the content of the description and the drawings of the present invention or the behaviors of indirectly or directly applying the present invention to relevant technical fields are all within the patent protection scope of the present invention.

What is claimed is:

1. A movement device capable of generating greater propelling force, comprising a shell, wherein an outer fluid channel and an inner fluid channel are formed in part of the interior of the shell or the whole interior of the shell; the outer fluid channel communicates with the outside through a plurality of first ports, and the inner fluid channel communicates with the outside through a plurality of second ports, the opening areas of the first ports are greater than the opening areas of the second ports; flow disturbing devices which are concave and convex relative to the surface are arranged in the outer fluid channel, the direction of the pressure difference generated due to the different flow speeds between the outer fluid channel and the inner fluid channel is opposite to the direction of the fluid pressure outside the shell, so that the pressure difference and the fluid pressure are mutually counteracted, and accordingly the propelling force sources of the movement device are obtained.

2. The movement device capable of generating greater propelling force according to claim 1, wherein the outer fluid channel communicates with the shell through the plurality of first ports, and part of the inner fluid channel or the whole inner fluid channel communicates with the outer fluid channel or/and the shell through the plurality of second ports.

3. The movement device capable of generating greater propelling force according to claim 1, wherein the inner fluid channel communicates with the second ports formed in the shell through communication pipes.

4. The movement device capable of generating greater propelling force according to claim 1, wherein the number of the inner fluid channel is at least one, the inner fluid channel communicates with the outer fluid channel or/and the shell, and the at least one inner fluid channel transfers the pressure difference from the high pressure of the inner fluid channel to the low pressure of the outer fluid channel layer by layer.

5. The movement device capable of generating greater propelling force according to claim 1, wherein the inner fluid channel is formed in the outer fluid channel and is of a hollow tubular structure, and the flow disturbing devices are arranged on the outer wall of the hollow tubular structure in a surrounding mode to lengthen the path of fluid passing through the outer fluid channel.

6. The movement device capable of generating greater propelling force according to claim 1, wherein the flow disturbing devices are flow disturbing surfaces or spiral flow disturbing surfaces or spiral flow disturbing strips which lengthen the path of the outer fluid channel and are concave and convex relative to the surface; each flow disturbing surface is composed of a plurality of smaller arcs or a plurality of small triangles or a plurality of trapezoids or a plurality of small squares, so that the path of the fluid passing through the outer fluid channel is lengthened to a greater extent.

7. The movement device capable of generating greater propelling force according to claim 1, wherein the movement device is an automobile or a train.

8. The movement device capable of generating greater propelling force according to claim 1, wherein the movement device is a ship, and the outer fluid channel and the inner fluid channel are formed in the shell below the waterline of the ship; a high-speed area formed by the outer fluid channel and the inner fluid channel is arranged in the upper area of the shell, and the pressure difference is generated between the high-speed area and a low-speed area formed by the lower portion and the surrounding area of the ship.

9. The movement device capable of generating greater propelling force according to claim 1, wherein the movement device is a submarine, the inner fluid channel and the outer fluid channel form a water storage bin of the submarine jointly, and a water suction port of a power device communicates with the outer fluid channel, so that fluid in the water storage bin is made to flow along with the fluid around without generating weight.

10. A movement device capable of generating greater propelling force, comprising a shell and a power device, wherein an outer fluid channel and an inner fluid channel which communicate with the outside are formed in part of the interior of the shell or in the whole interior of the shell; the outer fluid channel communicates with a suction port of the power device, and the direction of the pressure difference generated due to the different flow speeds between the outer fluid channel and the inner fluid channel is opposite to the direction of the fluid pressure outside the shell, so that the pressure difference and the fluid pressure are mutually counteracted, and accordingly the propelling force sources of the movement device are obtained;

the outer fluid channel communicates with the shell through a plurality of first ports, and the inner fluid channel communicates with the outer fluid channel or/and the shell through a plurality of second ports; and the opening areas of the first ports are greater than the opening areas of the second ports.

11. The movement device capable of generating greater propelling force according to claim 10, wherein the inner fluid channel communicates with the second ports formed in the shell through communication pipes.

12. The movement device capable of generating greater propelling force according to claim 10, wherein the number of the inner fluid layer is at least one, the at least one inner fluid channel communicates with the outer fluid channel or/and communicates with the outside, and the at least one inner fluid channel transfers the pressure difference from the high pressure of the inner fluid channel to the low pressure of the outer fluid channel layer by layer.

13. The movement device capable of generating greater propelling force according to claim 10, wherein the inner fluid channel is formed in the outer fluid channel and is of a hollow tubular structure.

14. The movement device capable of generating greater propelling force according to claim 10, wherein control devices used for controlling opening, closing and controlling the flow are arranged on the air ports.

15. The movement device capable of generating greater propelling force according to claim 10, wherein the movement device is a train.

16. The movement device capable of generating greater propelling force according to claim 10, wherein the movement device is an automobile.

17. The movement device capable of generating greater propelling force according to claim 10, wherein the movement device is a ship, and the outer fluid channel and the inner fluid channel are formed in the shell below the waterline of the ship; on the upper portion of the shell below the waterline of the ship, the outer fluid channel and the inner fluid channel communicate with the power device, so that a high-speed area is formed, and a pressure difference from bottom to top is formed between the high-speed area and a low-speed area formed by low-speed fluid on the lower portion of the ship and around the ship.

18. The movement device capable of generating greater propelling force according to claim 10, wherein the movement device is a submarine, the inner fluid channel and the outer fluid channel form a water storage bin of the submarine, so that fluid in the water storage bin is made to flow along with the fluid around without generating weight.

19. The movement device capable of generating greater propelling force according to claim 10, wherein the outer fluid channel and the inner fluid channel are formed in the front portion of the shell of the movement device; the outer fluid channel communicates with a suction port of the power device arranged on the rear portion of the shell through a channel, so that a high negative pressure area is formed on the front portion of the shell, a nozzle of the power device is arranged on the rear portion of the shell and generates a high positive pressure propelling area, and the pressure difference formed between the high negative pressure area of the front portion of the shell and the high positive pressure area of the rear portion of the shell serves as a greater propelling force source of the movement device.

* * * * *